US009802197B2

(12) United States Patent
Vahidi et al.

(10) Patent No.: US 9,802,197 B2
(45) Date of Patent: Oct. 31, 2017

(54) FLUID RESERVOIR

(71) Applicant: CYNVENIO BIOSYSTEMS, INC., Westlake, CA (US)

(72) Inventors: Behrad Vahidi, Agoura Hills, CA (US); Bernard Strong, Tarzana, CA (US); Samuel Ferguson, Ventura, CA (US)

(73) Assignee: Cynvenio Biosystems, Inc., Westlake, CA (US)

( * ) Notice: Subject to any disclaimer, the term of this patent is extended or adjusted under 35 U.S.C. 154(b) by 186 days.

(21) Appl. No.: 14/428,351

(22) PCT Filed: Sep. 11, 2013

(86) PCT No.: PCT/US2013/059292
§ 371 (c)(1),
(2) Date: Mar. 13, 2015

(87) PCT Pub. No.: WO2014/046943
PCT Pub. Date: Mar. 27, 2014

(65) Prior Publication Data

US 2015/0224501 A1 Aug. 13, 2015

Related U.S. Application Data

(60) Provisional application No. 61/702,734, filed on Sep. 18, 2012.

(51) Int. Cl.
*G01N 1/00* (2006.01)
*B01L 3/00* (2006.01)

(52) U.S. Cl.
CPC ......... *B01L 3/563* (2013.01); *B01L 3/502715* (2013.01); *B01L 3/502746* (2013.01);
(Continued)

(58) Field of Classification Search
CPC ....... B01L 2400/043; B01L 2200/0652; B01L 2300/0816; B01L 2400/0487; G01N 35/0098
(Continued)

(56) References Cited

U.S. PATENT DOCUMENTS 2,581,031 A * 1/1952 Kruzik .................... B29B 7/401 241/82.1
2,755,002 A * 7/1956 Gustafson ................ A01C 7/08 111/173
(Continued)

FOREIGN PATENT DOCUMENTS

CN 2725265 Y 9/2005
CN 201259501 Y 6/2009
(Continued)

OTHER PUBLICATIONS

CN patent application No. 201380060163.2, Office Action dated Jun. 2, 2016.
(Continued)

*Primary Examiner* — Eric S McCall
*Assistant Examiner* — Mohammed E Keramet-Amircola
(74) *Attorney, Agent, or Firm* — Weaver Austin Villeneuve & Sampson LLP

(57) ABSTRACT

Provided herein are fluid reservoirs or hoppers for controlled delivery of liquid biological sample to a microfluidic device.

23 Claims, 5 Drawing Sheets

A

B

C

(52) U.S. Cl.
CPC . *B01L 2200/027* (2013.01); *B01L 2200/0605* (2013.01); *B01L 2300/12* (2013.01)

(58) Field of Classification Search
USPC ............................................................ 73/863
See application file for complete search history.

(56) References Cited

U.S. PATENT DOCUMENTS

| | | | | |
|---|---|---|---|---|
| 3,178,066 | A * | 4/1965 | Martin ...................... B65B 3/08 | 222/132 |
| 4,773,354 | A * | 9/1988 | Wilbur .................... B05C 5/002 | 118/321 |
| 6,425,424 | B1 * | 7/2002 | Ellis Calvo ............. B65B 39/00 | 141/331 |
| 6,481,648 | B1 | 11/2002 | Zimmermann | |
| 2002/0143272 | A1 | 10/2002 | Crawford et al. | |
| 2002/0143293 | A1 | 10/2002 | Francavilla et al. | |
| 2007/0014694 | A1 | 1/2007 | Beard et al. | |
| 2011/0003303 | A1 * | 1/2011 | Pagano ............. B01L 3/502761 | 435/6.19 |

FOREIGN PATENT DOCUMENTS

| | | |
|---|---|---|
| CN | 102009933 A | 4/2011 |
| CN | 202410699 U | 9/2012 |
| RU | 2432577 | 11/2009 |

OTHER PUBLICATIONS

EP patent application No. 13838176.9, Supplementary European Search Report dated Apr. 26, 2016.
WO patent application No. PCT/US2013/059292, International Search Report and Written Opinion dated Feb. 20, 2014.
WO patent application No. PCT/US2013/059292, International Preliminary Report on Patentability dated Mar. 24, 2015.
Chinese Office Action dated Apr. 12, 2017 issued in Chinese Application No. 2013800601632.

* cited by examiner

A

FLUID RESERVOIR

CROSS-REFERENCE TO RELATED APPLICATIONS

This application is a U.S. national phase filing under 35 U.S.C. §371 of International Application No. PCT/US2013/059292, filed on Sep. 11, 2013, which claims the benefit under 35 U.S.C. §119(e) of U.S. Provisional Application No. 61/702,734, filed on Sep. 18, 2012, which is hereby incorporated herein by reference in its entirety for all purposes.

FIELD

Provided herein are fluid reservoirs or hoppers for controlled delivery of liquid biological sample to a microfluidic device.

BACKGROUND

By design, the microfluidic chip can hold only a small amount of volume. In order to automate the manual process of pipetting fluids into the microfluidic chip, it is important to provide enough time between pipetting steps that allows a machine to perform pipetting tasks until it is ready for the next step. Without the reservoir, the machine would be unable to perform tasks needed for the next step in the protocol. Previously, connections to the microfluidic device did not have a fluid reservoir. Instead, they were directly connected to the microfluidic device preventing any sort of open architecture that would allow changes to the protocol to be easily performed.

SUMMARY

In one aspect, fluid reservoir is provided. In some embodiments, the fluid reservoir comprises:

i) a funnel portion, wherein the funnel portion has a wide inlet for receiving fluid and a narrow outlet for draining fluid at a constant flow rate; and ii) an attachment portion in fluid communication with the funnel portion via the narrow outlet, wherein the inner surface of the attachment portion comprises threads for a liquid impermeable seal with a manifold, wherein the fluid reservoir can hold a maximum volume of about 2 mL. In some embodiments, the open angle of the funnel portion is in the range of about 25° to about 35°, e.g., about 30°. In some embodiments, the outer surface of the funnel portion comprises two flanges positioned 180° from one another and adjacent to the narrow outlet. In some embodiments, the narrow outlet has an inner diameter in the range of about 0.10 to about 0.20 inches. In some embodiments, the fluid reservoir is in fluid communication with a microfluidic device. In some embodiments, the fluid reservoir is comprised of high-density polyethylene. In some embodiments, the fluid reservoir is produced by a molding process. In some embodiments, the fluid reservoir is produced by a blow molding process. In some embodiments, the fluid reservoir is as depicted in FIGS. 1, 2, 3 and/or 5.

In a related aspect, a manifold connected to and in fluid communication with a fluid reservoir described herein is provided. In some embodiments, the manifold is directly connected to the fluid reservoir. In some embodiments, the manifold is connected to the fluid reservoir via an adaptor. In some embodiments, the manifold is in fluid communication with a microfluidic device. In some embodiments, the manifold is part of and in fluid communication with a system for isolating rare cell populations from a mixture of cells.

In a further aspect, a method of delivering fluid to a microfluidic device at a constant flow rate is provided. In some embodiments, the methods comprise inputting fluid into a fluid reservoir or a manifold as described herein.

DETAILED DESCRIPTION

1. Introduction

Provided herein are fluid reservoirs for use in delivering sample to a microfluidic device. The fluid reservoirs described herein provide a removable sample inlet that allows a hermetic seal with consumable microfluidic devices. The reservoir interlocks with variety of manifolds with a twist and lock mechanism for application of biological samples through downstream microfluidic devices. The unique design of the reservoir prevents the biological samples from coming into direct contact with instrument parts or any solid interface on the manifold. Furthermore, the fluid reservoirs described herein slowly feed a large amount of volume into the microfluidic device. The fluid reservoirs provide a gravity fed volume of fluid to flow into the microfluidic device at a known rate. In various embodiments, the fluid reservoirs can be formed using a blow-molded process. In various embodiments, the fluid reservoirs can be made from polyethylene, polypropylene or another polymer, or mixtures thereof. As appropriate, the fluid reservoirs can be coated to provide a means of maintaining maximum recovery of any fluid that flows through.

Generally, the fluid reservoir has a funnel configuration. The geometry of the disposable fluid reservoir allows for the narrow end of the funnel to be attached to the microfluidic device while the wide end of the funnel accommodates a fluid volume greater than the volume of the microfluidic chip to which the fluid is delivered to be slowly dispensed into the microfluidic chip.

The fluid reservoirs described herein find use with any liquid handling robotics designed for pipetting directly into an actively running microfluidic device. The fluid reservoirs find use with automated platforms that require a large volume reservoir for delivering fluid to one or more microfluidic chips.

2. Structural Features

Figure 1:
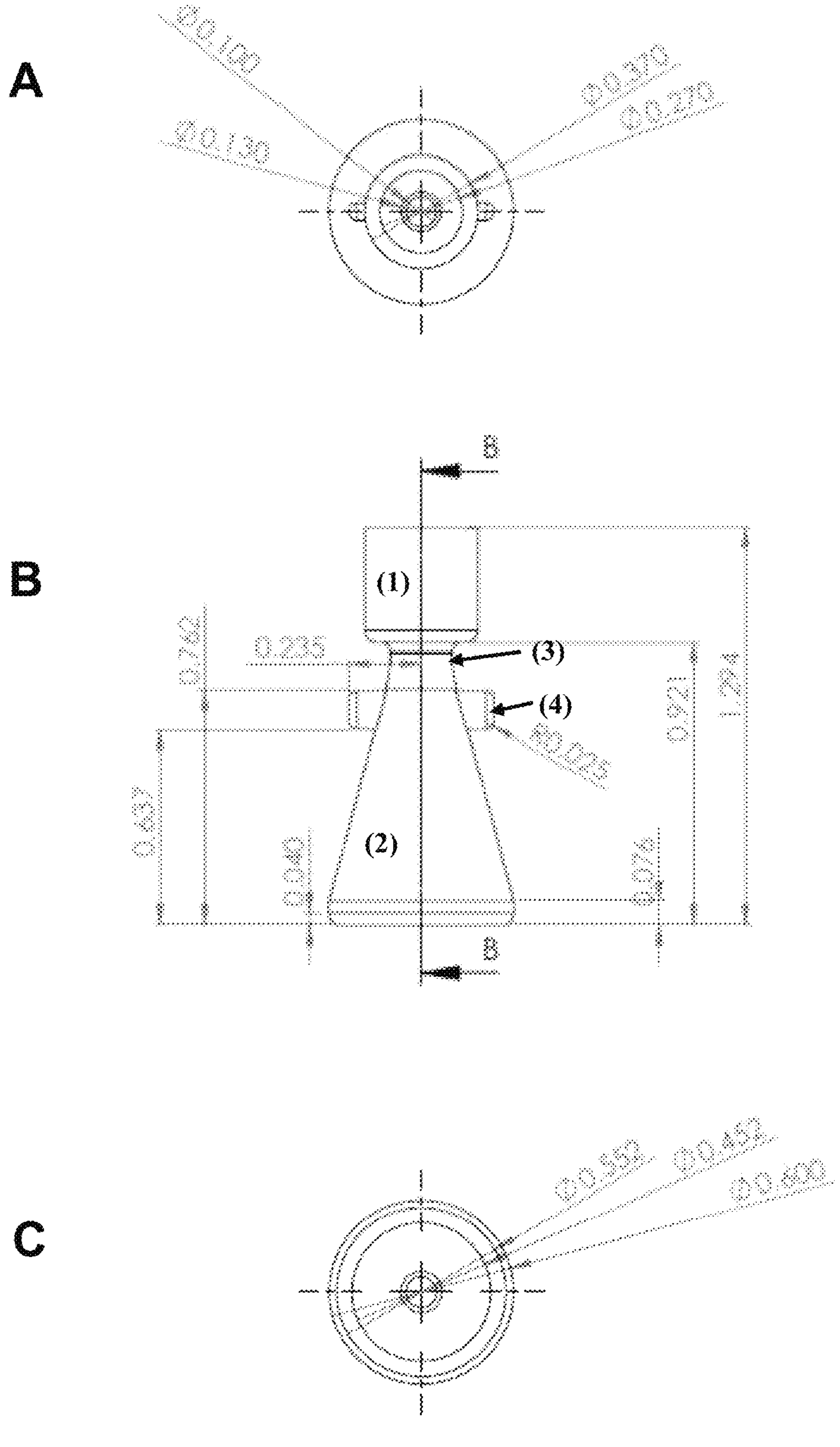
FIGS. 1A-C illustrate top, side and bottom views of a fluid reservoir. Dimensions are in inches.
Figure 2:
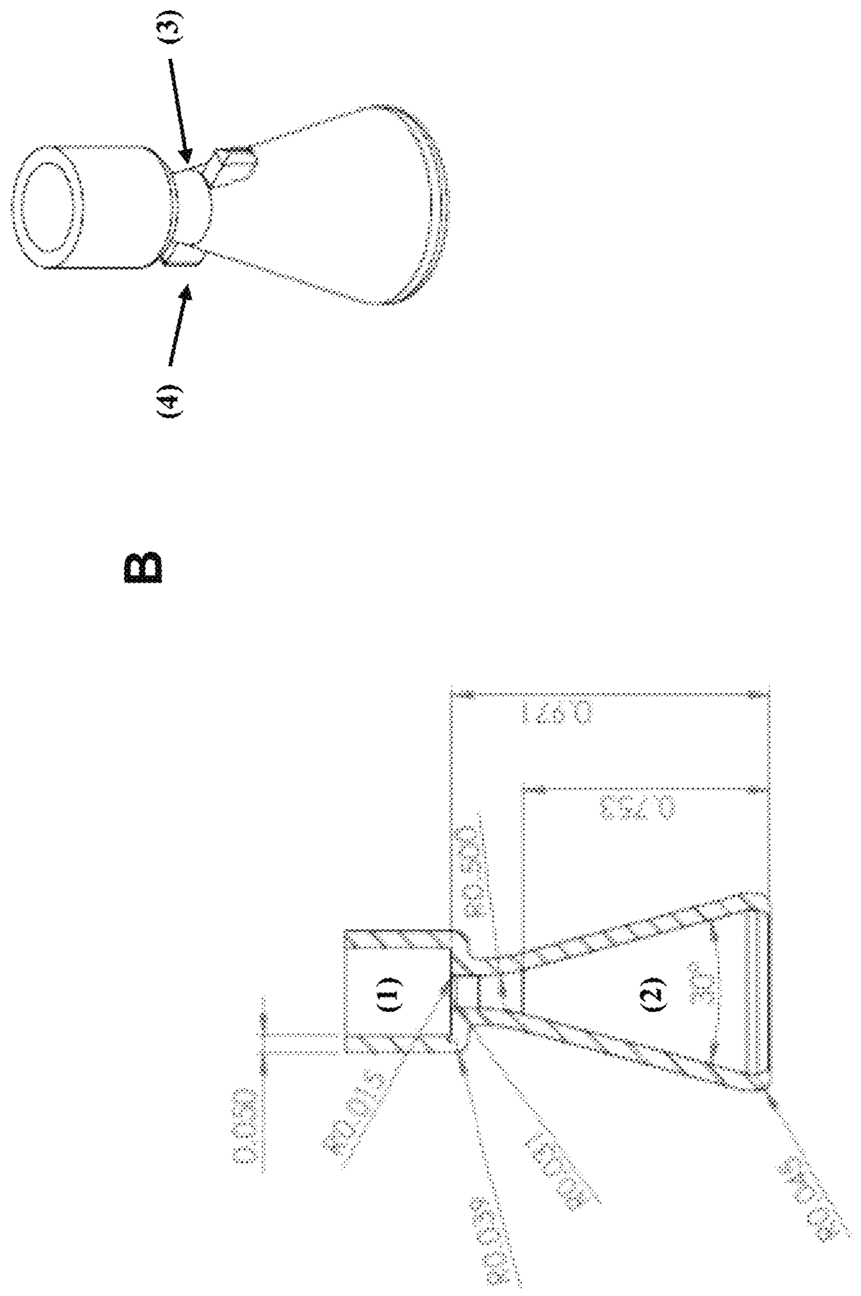
FIGS. 2A-B illustrate a cross-sectional and side-angle view of a fluid reservoir. Dimensions are in inches.

Turning to FIGS. 1 and 2, the fluid reservoir generally has a funnel portion (2) comprising a wide orifice or inlet for fluid intake and a narrow orifice or outlet (3) for fluid drainage. The funnel portion is connected to and in fluid communication with the to an attachment portion (1) via the narrow orifice or outlet (3).

In varying embodiments, the attachment portion (1) has one or more horizontal or angled threads on it inner surface so that it can be screwed or snapped onto an adaptor attached to an inlet on a manifold or a microfluidic chip or directly onto an inlet of a manifold or microfluidic chip, e.g., of an inlet in fluid communication with a microfluidic chip. In some embodiments, the attachment portion (1) has a smooth inner surface so that fitted or sealed onto an adaptor (5) attached to an inlet on a manifold or microfluidic chip, or directly onto an inlet of a manifold or microfluidic chip, e.g., of an inlet in fluid communication with a microfluidic chip. In varying embodiments, the attachment portion (1) is configured with threads on the inner surface of the attachment portion (1) and/or flanges on the outer surface of the funnel portion (2) abutting the narrow orifice or outlet (3) such that the fluid reservoir can be attached to or fitted within a manifold via a "twist and lock" mechanism or maneuver. The attachment portion is configured to attach to a manifold or microfluidic chip, with or without an adaptor, and create a seal that is impervious to and does not leak liquid. In varying embodiments, the attachment portion (1) has a length or depth of in the range of about 0.3 to about 0.5 inches, e.g., in the range of about 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50 inches. In varying embodiments, the attachment portion (1) has an inner diameter in the range of about 0.15 to about 0.30 inches, e.g., in the range of about 0.15, 0.16, 0.17, 0.18, 0.19, 0.20, 0.21, 0.22, 0.23, 0.24, 0.25, 0.26, 0.27, 0.28, 0.29, or 0.30 inches. The inner diameter of the attachment portion can be adjusted as appropriate depending on the desired fluid flow rate, where a narrower diameter correlates with a relatively slower flow rate and a wider diameter correlates with a relatively faster flow rate. In some embodiments, the attachment portion (1) has a length or depth of about 0.37 inches and an inner diameter of about 0.27 inches.

The attachment portion (1) of the fluid reservoir is connected to and in fluid communication with the funnel portion (2) via a narrow orifice or outlet or neck (3). In varying embodiments, the inner diameter of the narrow orifice or outlet or neck is in the range of about 0.10 to about 0.20 inches, e.g., in the range of about 0.10, 0.11, 0.12, 0.13, 0.14, 0.15, 0.16, 0.17, 0.18, 0.19, or 0.20 inches. In some embodiments, the inner diameter of the narrow orifice or outlet or neck is about 0.13 inches. The inner diameter of the narrow orifice or outlet or neck (3) can be adjusted as appropriate depending on the desired fluid flow rate flowing through the narrow orifice or outlet, where a narrower diameter correlates with a relatively slower flow rate and a wider diameter correlates with a relatively faster flow rate.

In varying embodiments, the funnel portion has a vertical length/depth (e.g., from the wide orifice or inlet to the neck) in the range of about 0.70 to about 1.5 inches, e.g., about 0.70, 0.75, 0.80, 0.85, 0.90, 0.95, 1.00, 1.05, 1.10, 1.15, 1.20, 1.25, 1.30, 1.35, 1.40, 1.45, or 1.50 inches. In varying embodiments, the side walls of the funnel portion can have open angle from the narrow orifice or outlet or neck (3) to the wide orifice or inlet in the range of about 25° to about 45°, e.g., about 25°, 26°, 27°, 28°, 29°, 30°, 31°, 32°, 33°, 34°, 35°, 36°, 37°, 38°, 39°, 40°, 41°, 42°, 43°, 44° 45°. D The narrower the open angle, the steeper the slopes of the internal surface of the funnel portion, which facilitates dispensation or slippage of cells in the hopper into the microfluidic device. In some embodiments, the open angle of the inner surface of the funnel portion of the hopper is 30°. The vertical length/depth and angle of the funnel portion can be adjusted as appropriate depending on the desired fluid flow rate, where a longer vertical length/depth and narrower diameter correlates with a relatively faster flow rate and a shorter vertical length/depth and wider angle correlates with a relatively slower flow rate. In varying embodiments, the wide orifice or inlet for fluid intake has an inner diameter in the range of about 0.40 to about 0.60, e.g., about 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59 or 0.60 inches. The inner diameter of the wide orifice or inlet for fluid is wide enough to conveniently and easily receive fluid input without spilling, and narrow enough to allow multiple fluid reservoirs to be attached to a panel of inlets for fluid delivery to a manifold, e.g., for delivery of fluid to a panel of microfluidic chips. See, e.g., FIGS. 3 and 5. In one embodiment, the funnel portion has a vertical length/depth of about 0.92-0.97 inches, an open angle of about 30° and a wide orifice or inlet of about 0.45-0.55 inches. In varying embodiments, the funnel portion of the fluid reservoir can hold a fluid volume in the range of about 0.2 mL to about 2.0 mL, e.g., about 0.2, 0.3. 0.4, 0.5, 0.6, 0.7, 0.8, 0.9, 1.0, 1.1, 1.2, 1.3, 1.4, 1.5, 1.6, 1.7, 1.8, 1.9, or 2.0 mL. In some embodiments, the funnel portion of the fluid reservoir can hold a fluid volume of about 1.5 mL to about 2.0 mL.

In varying embodiments, the outer surface of the funnel portion has flanges or tabs (4). The flanges or tabs are positioned 180° from one another and adjacent to the narrow orifice or outlet or neck. In varying embodiments, the flanges or tabs stick out perpendicularly from the outer surface of the funnel portion by about 0.10 to about 0.15 inches, e.g., 0.10, 0.11, 0.12, 0.13, 0.14, 0.15 inches, typically about 0.12-0.13 inches. The flanges find use as guides that can lock into grooves, e.g., in the manifold to facilitate the stability and liquid impermeable seal between the fluid reservoir and manifold when the fluid reservoir is mounted on the manifold, directly or via an adaptor. See, e.g., FIG. 5.

In varying embodiments, the thickness of the walls of the fluid reservoir are in the range of about 0.030 to about 0.10 inches, e.g., 0.030. 0.035, 0.040, 0.045, 0.050, 0.055, 0.060, 0.065, 0.070, 0.075, 0.080, 0.085, 0.090 or 0.10 inches. In one embodiment, the thickness of the walls of the fluid reservoir about 0.050. The thickness of the walls of the fluid reservoir can be uniform or varying, as appropriate. The fluid reservoirs are generally made of materials that are inert to and which do not bind with or dissolve when contacted with biological fluids, e.g., whole blood, cell suspended in media. In varying embodiments, the fluid reservoirs are made of one or more polymers, e.g., polyethylene, polypropylene and mixtures thereof. In some embodiments, the fluid reservoirs are comprised of high density polyethylene (HDPE).

Figure 4:
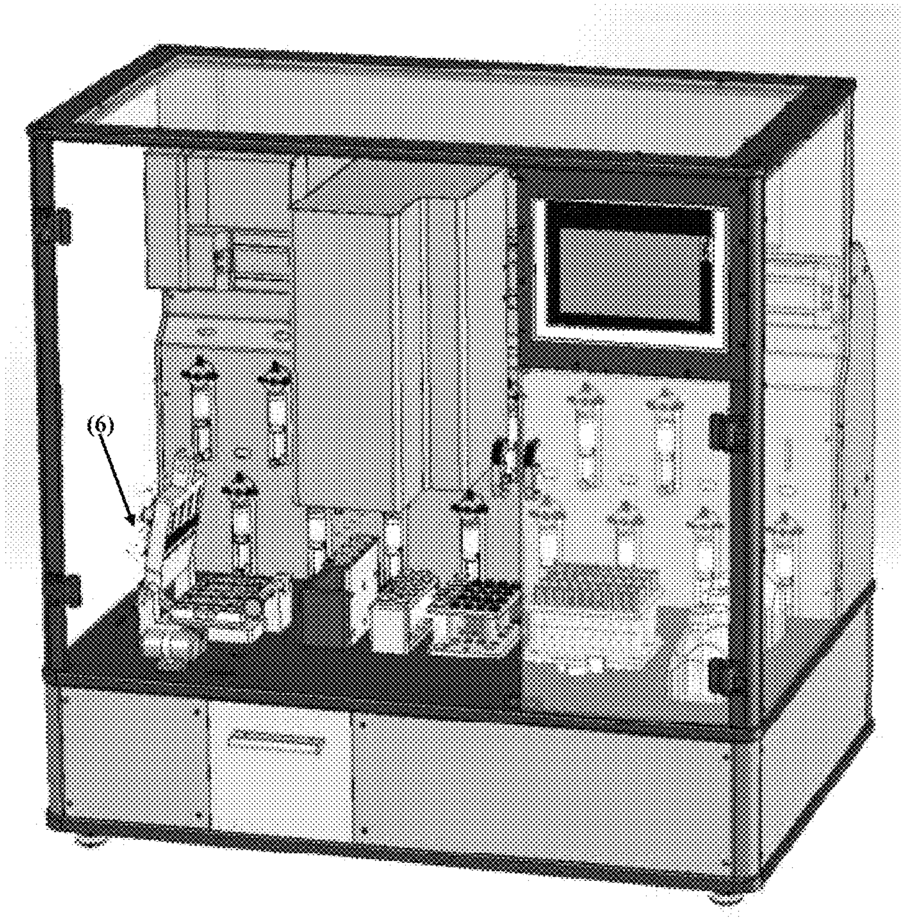
FIG. 4 illustrates the placement of the microfluidic chip manifold (6) in the context of an automated cell separation/isolation system. In particular, the illustration shows Cynvenio's Liquid Biopsy Platform for rare cell isolation. The platform delivers high purity Circulating Tumor Cell (CTC) recovery directly from whole blood and yields viable CTCs that can be taken off-platform for downstream molecular processing including PCR and deep sequencing.

In varying embodiments, the hopper dispenses or drains fluid at a rate in the range of about 2 mL/hr to about 25 mL/hr, e.g., 2.0, 2.5, 3.0, 3.5, 4.0, 4.5, 5.0, 5.5, 6.0, 6.5, 7.0, 7.5, 8.0, 10, 12, 15, 18, 20, 22 or 25 mL/hr. In some embodiments, the hopper dispenses or drains fluid at a rate of about 5.0 ml/hr. As discussed above, the gravity-based fluid dispensing or drainage rate can be modulated or adjusted by adjusting the inner diameter of the narrow orifice or outlet, the open angle of the funnel portion and the amount of fluid maintained in the hopper. When mounted in a manifold of a system comprising a microfluidic chip (e.g., as depicted in FIG. 4), the dispensing or drainage rate can be modulated or adjusted by modulating or adjusting the dispensing and withdrawal rates of pumps driving fluid flow.

Figure 3:
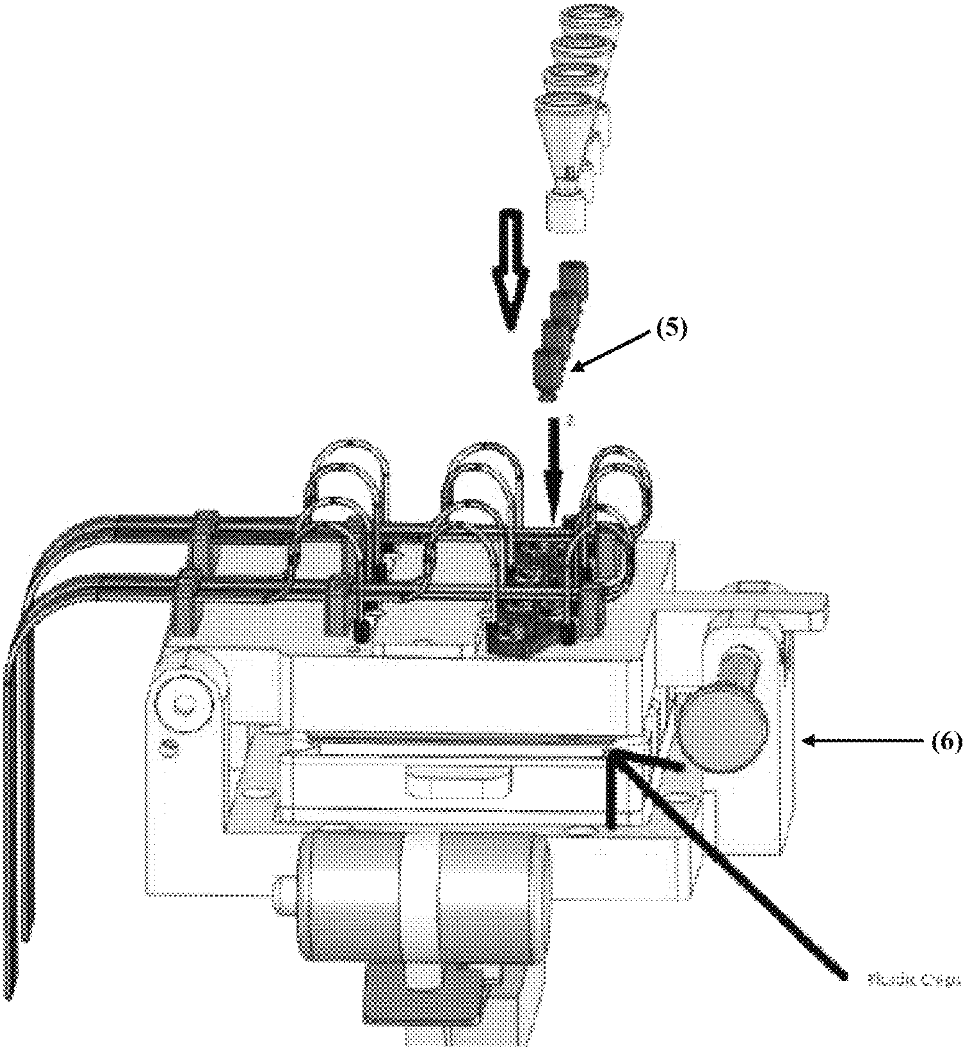
FIG. 3 illustrates how the fluid reservoir connects with an adaptor (5) which attaches to a fluid inlet in direct fluid communication with a microfluidic chip in the microfluidic chip manifold (6).

Turning to FIG. 3, an illustrative manifold (6) that houses one or more microfluidic chips is depicted. In the depicted embodiment, a series of hoppers are shown that connect to the manifold via an adaptor (5). The hopper and adaptor seal onto an orifice in the manifold in fluid communication with the microfluidic device to create a fluid impermeable seal for delivery or dispensation of fluid from the hopper through a channel in the manifold to the microfluidic device. In some embodiments, the fluid reservoir is directly attached to and in direct fluid communication with a microfluidic chip, e.g., placed within a manifold. In some embodiments, the fluid reservoir is attached to and in fluid communication with a microfluidic chip via an adaptor (5). In one embodiment, the adaptor interfaces with the microfluidic chip. The flanged base of the adaptor is formed to press against the flat top of the chip and seals the fluidic channel, rendering it impermeable to fluid. The adaptor can be molded to fit into the base of the hopper or fluid reservoir as an interface. In one embodiment, the adaptor is made of silicon. In another embodiment, the microfluidic chip comprises a female connector molded on the top of the chip. The hopper could then be molded or blow molded with a male counter to effect the interaction of the hopper with the chip.

Figure 5:
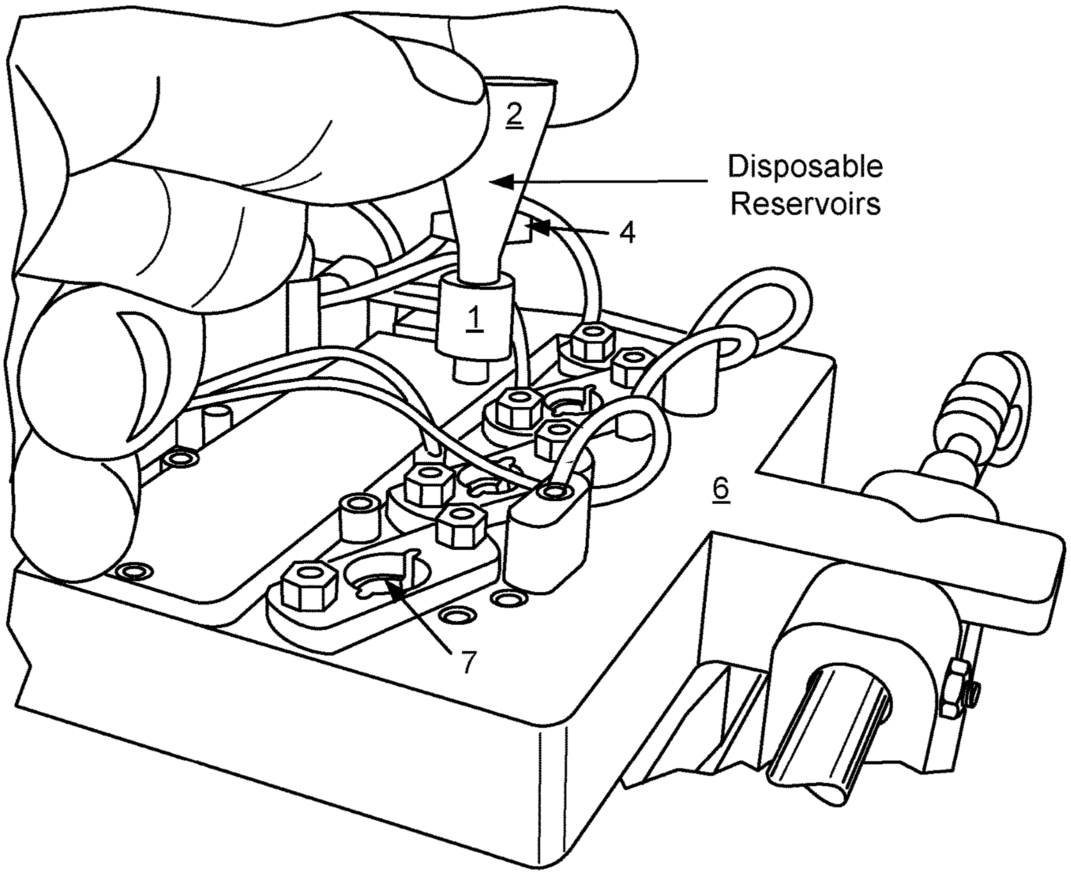
FIG. 5 illustrates a method for mounting a fluid reservoir onto a manifold with orifices that are in fluid communication with a microfluidic chip. In particular, the illustration shows how the hopper is engaged with the manifold on the Liquid Biopsy machine.

FIG. 5 shows a photograph of another illustrative manifold. The hopper seals into an orifice that has grooves to accommodate the flanges protruding from the hopper (7). In varying embodiments, the hopper directly twists or snaps into the orifice and the flanges guide or lock the hopper into a stable and sealed position. The hopper may directly seal into the orifice in the manifold or may seal into the orifice in the manifold through an adaptor. FIG. 4 shows the placement of the manifold (6) in the context of a system for processing rare cell populations from a mixture of cells, e.g., as described in U.S. Pat. Nos. 7,807,454 and 8,263,387, and U.S. Patent Publication Nos. 2012/0129252; 2012/0100560; 2012/0045828; and 2011/0059519, all of which are hereby incorporated herein by reference in their entirety for all purposes. As depicted in FIG. 4, the manifold is in its open position, also showing placement of the microfluidic chips.

3. Methods of Use

The fluid reservoir finds use in the controlled delivery of fluid to a microfluidic device, e.g., at a constant and predetermined flow rate. The flow rate of fluid dispensation through the narrow outlet can be controlled, e.g., by adjusting the inner diameter of the narrow outlet, by adjusting the open angle and vertical height of the funnel portion, and by adjusting the fluid levels in the funnel. The fluid reservoirs are further useful for conveniently receiving biological fluids delivered by either manual or automated procedures. The wide orifice or inlet for fluid input reduces or eliminates spillage, contamination (e.g., of the area surrounding the inlet) and cross-contamination.

In varying embodiments, the fluid reservoirs are attached to an orifice in a manifold to allow fluid communication with a microfluidic device and controlled delivery or dispensation of fluid to the microfluidic device. The fluid reservoir may be attached directly to the manifold or attached to the manifold through an adaptor. In some embodiments, the fluid reservoir may be attached directly to the microfluidic chip (e.g., inside a manifold) or attached to the microfluidic chip through an adaptor. Depending on the design or presence of the threads within the attachment portion of the fluid reservoir, the fluid reservoir can be screwed onto the manifold or adaptor and/or snapped into place and/or sealed onto the manifold or adaptor. The attachment between the fluid reservoir and manifold or adaptor or microfluidic chip is impermeable to fluid so that all fluid passing through the fluid reservoir is delivered to the microfluidic device and does not leak at the junction between the fluid reservoir and manifold or adaptor or microfluidic chip.

The fluid reservoirs and adaptors can be reusable or disposable. In varying embodiments, the fluid reservoirs and/or adaptors are used once and replaced.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A fluid reservoir comprising:

i) a funnel portion (2) comprising an open angle in the range of 25° to 35°, wherein the funnel portion has a wide inlet for receiving fluid and a narrow outlet (3) for draining fluid at a constant flow rate, wherein the wide inlet has an inner diameter in the range of 0.40 to 0.60 inches and the narrow outlet has an inner diameter in the range of 0.10 to 0.20 inches; and ii) an attachment portion (1) in fluid communication with the funnel portion via the narrow outlet, wherein the attachment portion has a length in the range of 0.3 to 0.5 inches and an inner diameter in the range of 0.15 to 0.30 inches, iii) two flanges (4) positioned 180° from one another and adjacent to the narrow outlet, wherein the flanges (4) are attached to and stick out perpendicularly from the outer surface of the funnel portion by 0.10 to 0.15 inches such that the fluid reservoir directly twists or snaps into an orifice of a manifold and the flanges guide or lock the fluid reservoir into a stable and sealed position, wherein the fluid reservoir holds a maximum volume of about 2 mL, and wherein the fluid reservoir dispenses or drains fluid at a rate in the range of 2 mL/hr to 25 mL/hr.

2. The fluid reservoir of claim 1, wherein the fluid reservoir is in fluid communication with a microfluidic device.

3. A method of delivering fluid to a microfluidic device at a constant flow rate, comprising inputting fluid into a fluid reservoir of claim 2.

4. The fluid reservoir of claim 1, wherein the fluid reservoir is comprised of high-density polyethylene (HDPE).

5. The fluid reservoir of claim 1, wherein the fluid reservoir is produced by a molding process.

6. The fluid reservoir of claim 1, wherein the fluid reservoir is produced by a blow molding process.

7. A microfluidic chip connected to and in fluid communication with the fluid reservoir of claim 1.

8. The microfluidic chip of claim 7, wherein a manifold (6) is directly connected to the fluid reservoir.

9. The microfluidic chip of claim 7, wherein a manifold (6) is connected to the fluid reservoir via an adaptor.

10. A manifold (6) connected to and in fluid communication with the fluid reservoir of claim 1.

11. The manifold (6) of claim 10, wherein the manifold is directly connected to the fluid reservoir.

12. The manifold (6) of claim 10, wherein the manifold (6) is connected to the fluid reservoir via an adaptor (5).

13. The manifold (6) of claim 10, wherein the manifold is in fluid communication with a microfluidic device.

14. The fluid reservoir of claim 1, wherein the thickness of the walls of the fluid reservoir are in the range of 0.030 to 0.10 inches.

15. The fluid reservoir of claim 1, wherein the fluid reservoir is made of a material that is inert to and which does not bind with or dissolve when contacted with biological fluids such as whole blood or cells suspended in media.

16. The fluid reservoir of claim 1, wherein the fluid reservoir is comprised of one or more polymers selected from the group consisting of polyethylene, polypropylene and mixtures thereof.

17. An apparatus comprising a fluid reservoir of claim 1 connected to an adaptor (5), wherein the attachment portion (1) has a smooth inner surface that is fitted or sealed onto the adaptor (5).

18. The apparatus of claim 17, wherein the adaptor is made of silicon.

19. A system comprising one or more apparatus of claim 17, each fluid reservoir in fluid communication with a manifold, wherein the adaptor (5) is attached to an inlet on the manifold, creating a seal that is impervious to and does not leak liquid.

20. The system of claim 19, wherein the manifold in fluid communication with a microfluidic device.

21. The system of claim 20, wherein the fluid reservoir comprises a fluid sample comprising circulating tumor cells (CTCs) for delivery to the microfluidic device.

22. The system of claim 21, wherein the dispensing or drainage rate of fluid from the fluid reservoir to the microfluidic device can be adjusted by adjusting the dispensing and withdrawal rates of one or more pumps driving fluid flow.

23. A method of delivering fluid to a microfluidic device at a constant flow rate, comprising inputting fluid into a fluid reservoir in the system of claim 19.

* * * * *